(12) United States Patent
Wang et al.

(10) Patent No.: US 10,624,161 B2
(45) Date of Patent: *Apr. 14, 2020

(54) SWITCHED MODE POWER SUPPLY DRIVER INTEGRATED WITH A POWER TRANSMISSION ANTENNA

(71) Applicant: SIGNIFY HOLDING B.V., Eindhoven (NL)

(72) Inventors: Gang Wang, Eindhoven (NL); Liang Shi, Eindhoven (NL); Ping Kian Bee, Eindhoven (NL); Jie Fu, Eindhoven (NL); Xiao Sun, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/720,520

(22) Filed: Sep. 29, 2017

(65) Prior Publication Data

US 2019/0261471 A1  Aug. 22, 2019

Related U.S. Application Data

(62) Division of application No. 15/306,089, filed as application No. PCT/EP2015/058489 on Apr. 20, 2015, now Pat. No. 9,814,108.

(30) Foreign Application Priority Data

Apr. 25, 2014 (WO) ................ PCT/CN2014/000445
Jun. 13, 2014 (EP) ..................................... 14172294

(51) Int. Cl.
*H05B 33/08* (2020.01)
*H01F 38/14* (2006.01)
(Continued)

(52) U.S. Cl.
CPC ......... *H05B 33/0815* (2013.01); *H01F 38/14* (2013.01); *H02J 50/10* (2016.02);
(Continued)

(58) Field of Classification Search
CPC ....... H05B 33/0815; H02J 50/10; H01F 38/14
See application file for complete search history.

(56) References Cited

U.S. PATENT DOCUMENTS 6,473,318 B1  10/2002  Qian et al.
6,657,529 B1  12/2003  Albach
(Continued)

FOREIGN PATENT DOCUMENTS

CA  2748787 A1  2/2012
EP  2770804 A1  8/2014
(Continued)

OTHER PUBLICATIONS

Geeng-Kwei Chang et al., "Multi-output Auxiliary Power Supply with Lossless Snubber", WSEAS Transactions on Circuits and Systems, Issue 6, vol. 12, Jun. 2013, pp. 191-198. (Year: 2013).*

*Primary Examiner* — Alexander H Taningco
*Assistant Examiner* — Pedro C Fernandez
(74) *Attorney, Agent, or Firm* — Daniel J. Piotrowski (57) ABSTRACT

A driver comprising a switched mode power supply, wherein said switched mode power supply comprises an existing coil, the driver circuit further comprises: a first power transmission antenna (42) formed as a first coil which is either the existing coil of the switched mode power supply or coupled to the existing coil of the switched mode power supply, said first power transmission antenna (42) is adapted for being magnetically coupled to a second power receiving antenna (44) thereby forming a wireless power transmitter.

15 Claims, 9 Drawing Sheets

(51) Int. Cl.
*H02J 50/10* (2016.01)
*H02M 3/335* (2006.01)
*H05B 37/02* (2006.01)

(52) U.S. Cl.
CPC .... *H02M 3/33507* (2013.01); *H05B 37/0227* (2013.01); *H05B 37/0272* (2013.01); *Y02B 20/346* (2013.01)

(56) References Cited

U.S. PATENT DOCUMENTS

| | | | |
|---|---|---|---|
| 6,714,428 B2 | 3/2004 | Huang et al. | |
| 7,489,527 B2 | 2/2009 | Lee et al. | |
| 8,125,208 B2 | 2/2012 | Gyland | |
| 8,787,044 B2 | 7/2014 | Yang et al. | |
| 2002/0130642 A1 | 9/2002 | Ettes et al. | |
| 2005/0088299 A1 | 4/2005 | Bandy et al. | |
| 2006/0092676 A1* | 5/2006 | Liptak | H02M 3/337 363/56.02 |
| 2008/0094862 A1 | 4/2008 | Li | |
| 2008/0116847 A1 | 5/2008 | Loke et al. | |
| 2009/0059603 A1 | 3/2009 | Recket et al. | |
| 2009/0212736 A1 | 8/2009 | Baarman et al. | |
| 2011/0057583 A1 | 3/2011 | Fattizzi | |
| 2011/0070831 A1 | 3/2011 | Nagai et al. | |
| 2011/0217927 A1 | 9/2011 | Ben-Shalom et al. | |
| 2011/0266345 A1 | 11/2011 | Fowler et al. | |
| 2012/0080944 A1 | 4/2012 | Recker et al. | |
| 2012/0194126 A1 | 8/2012 | Hui | |
| 2012/0212150 A1* | 8/2012 | Lakirovich | H05B 33/086 315/250 |
| 2013/0241699 A1 | 9/2013 | Covaro et al. | |
| 2014/0043127 A1 | 2/2014 | Worek et al. | |
| 2014/0160817 A1 | 6/2014 | Jeong et al. | |
| 2014/0232201 A1 | 8/2014 | Staring | |

FOREIGN PATENT DOCUMENTS

| | | |
|---|---|---|
| GB | 2429372 A | 2/2007 |
| GB | 2490119 A | 10/2012 |
| JP | 2002272020 A | 9/2002 |
| JP | 2009089549 A | 4/2009 |
| JP | 2012019660 A | 1/2012 |
| JP | 2014075963 A | 4/2014 |
| KR | 2012116897 A | 10/2012 |
| TW | 264247 B | 10/2006 |
| WO | 2005106901 A2 | 11/2005 |
| WO | 2008033984 A2 | 3/2008 |
| WO | 2008059412 A1 | 5/2008 |
| WO | 2009029960 A2 | 3/2009 |
| WO | 2013046104 A1 | 4/2013 |

* cited by examiner

SWITCHED MODE POWER SUPPLY DRIVER INTEGRATED WITH A POWER TRANSMISSION ANTENNA

CROSS REFERENCE TO RELATED CASES

This application is a Divisional application of pending U.S. Ser. No. 15/306,089 filed on Oct. 22, 2016 which is the U.S. National Phase Application of International Application No. PCT/EP2015/058489, filed Apr. 20, 2015 and claims the benefit of European Patent Application 14172294.2, filed Jun. 13, 2014 and Chinese PCT/CN2014/000445, filed Apr. 25, 2014. These applications are hereby incorporated by reference.

FIELD OF THE INVENTION

This invention relates to drivers with switched mode power supply.

BACKGROUND OF THE INVENTION

Sensors have been widely used in intelligent lighting control systems. For example, ceiling or wall mounted occupancy sensors can detect activities within a specified area and send signals to a lighting controller. By doing this, the system can automatically turn lights on when someone enters an area or turn light off soon after the last occupant has left, to reduce energy use and provide added convenience.

Another example of intelligent lighting control is daylight harvesting, which concerns using daylight to offset the amount of electric lighting needed to properly light a space in order to reduce energy consumption. This is accomplished by dimming or switching electric lighting in response to changing daylight availability in the space, which is for example detected by a ceiling mounted light level sensor.

One major inconvenience of incorporating sensors in a lighting control system is to establish the connections between the sensors and the light points. Currently this is done in one of two ways.

A first method uses a wired connection between a sensor and a lighting controller which is either a central system controller or a distributed controller at the light point. This brings difficulties for retrofit applications.

A second method uses wireless connections for easy retrofit. However, this adds complexity to the commissioning, i.e., pairing between sensors and light points. To solve this, intelligent luminaires with integrated sensors have been developed in recent years.

For example, LED luminaires are known with integrated occupancy sensors for maximizing energy efficiency, and luminaires are known with integrated motion sensors and daylight sensor. By using intelligent luminaires with built-in sensors instead of separately installed luminaires and sensors, the installation and commissioning costs of lighting control systems are reduced. However, this kind of luminaire-integrated control also has disadvantages.

Firstly, the design complexity of the luminaires is increased. Different sensors may have analog signals (e.g., a continuous voltage signal) or digital signals output through different data interfaces (e.g., SPI and I²C used for digital sensors). This must be taken into consideration by the luminaire manufactures when adding sensors into their luminaires. When it is necessary to replace an already integrated sensor with a different model (e.g., from a different supplier), redesigns are sometimes unavoidable.

Secondly, a lighting system using luminaires with built-in sensors has limited flexibility. The sensor placement is tightly bound by the luminaire placement. For example, a storage room having luminaires with temperature sensors may be redesigned into a meeting room. The temperature sensing function is no longer needed and occupancy detection is instead required. The user has to replace the luminaire which is expensive and inconvenient.

Thus, current intelligent luminaires with built-in sensors have the disadvantages of high design complexity and low flexibility.

D1 EP2770804A1, D2 WO2009/029960A2, D3 US2011/057583A1 and D6 US2012/080944A1 are all about wireless communication with lamps.

SUMMARY OF THE INVENTION

The invention is defined by the claims.

According to the invention, there is provided a lighting unit comprising:
  a housing;
  a light source arrangement within the housing;
  a light source controller within the housing;
  a first radio frequency antenna within the housing;
  a second radio frequency antenna provided within or on the housing, for communicating with said first radio frequency antenna;
  a contact interface at the outer surface of the housing which comprises first contacts which are electrically connected to the second radio frequency antenna; and
  a reader circuit connected to the first radio frequency antenna, for processing signals received from said contact interface via said first and second near field antennas.

This arrangement separates a circuit part and an antenna part of a radio frequency sensor, such as a near field communication ("NFC") sensor. The antenna part is formed as part of the lighting unit housing (i.e. the "second radio frequency antenna"), whereas the circuit part is provided by the external sensor. This means that standard RF communication protocols (e.g. RFID) can be used by sensors which are physically (rather than wirelessly) electrically connected to the lighting unit. This provides a modular approach which enables different sensors to be used. The RF protocols enable the different sensors to be identified by the lighting unit. In this way, the overall lighting system is easily reconfigurable by simply selecting the desired sensor to be electrically connected to the lighting unit. The size of the antenna used by the sensor is not limited by the size of the sensor itself, and can be larger since it is formed as part of the housing of the main lighting unit. Similarly, the sensor can be made smaller and lower cost, so that a set of sensors can be available for use with the lighting unit, giving easy and low cost reconfiguration options.

A modular approach is thus provided to enable an intelligent lighting unit with easily expandable sensing function. A passive or semi-passive sensor with a built-in NFC tag can be attached to the lighting unit to provide connection to the antenna of the tag. The lighting unit then reads the sensing data from the sensor via a built-in NFC reader. In the case of a passive sensor, it harvests energy from the RF signal emitted by the NFC reader for both the sensing operation and the NFC communication. In the case of a semi-passive sensor with an internal energy source such as a battery or solar cell, the energy source is provided mainly for the sensing function.

By taking this modular approach, a number of sensors can be attached to the luminaire as needed. The NFC (e.g. RFID)

reader of the lighting unit communicates with the attached sensor which has only the chip part of a NFC (e.g. RFID) tag because the antenna for the NFC tag is part of the lighting unit.

The lighting unit may comprise a luminaire and the light source arrangement may comprise an LED arrangement. This provides a modular reconfigurable LED lighting system.

The second radio frequency antenna may be embedded in an outer wall of the housing and the contact interface is used for interfacing an external sensor. In this way, the second radio frequency antenna is as close as possible to the tag part of the external sensor, and there is a contact interface for providing connection between them.

The lighting unit may further comprise a wireless power transmitter module. This enables wireless powering of the external sensor as well as reading the sensor information, so that the sensor can be made as low cost as possible. The wireless power transfer may in one example be achieved using the inductive coupling between the first and second radio frequency antennae.

The lighting unit may further comprise a first power transmission antenna within the housing connected to the wireless power transmitter module and a second power receiving antenna provided within or on the housing adapted to wirelessly couple with said first power transmission antenna, wherein the contact interface further comprises second contacts which are electrically connected to the second power receiving antenna.

This arrangement provides dedicated coupled antennae for data transfer and for power transfer, so that the respective operations can be optimized.

A light source driver may be provided which comprises a switched mode power supply. The first power transmission antenna may comprise a first coil or coils coupled with or placed in said switched mode power supply.

The first power transmission antenna may thus comprise a first coil or coils either in parallel with a winding of the switched mode power supply or else actually using a winding of the power supply. The second power receiving antenna may comprise a second coil or coils sharing a core or otherwise magnetically coupled with the first coil or coils. This arrangement for example makes use of an existing inductive transformer used by the light source controller to implement the wireless power transfer.

The switched mode power supply may for example comprise a flyback converter including a transformer which has a primary side winding and a secondary side winding, and said first coil or coils are in parallel with the primary side winding and said second power receiving antenna comprises a second coil or coils magnetically coupled with the first coil or coils.

By providing a coil in parallel with the primary side winding, the magnetic field present in the inductive transformer is additionally used for wireless power transfer.

Alternatively, the first power transmission antenna may comprise the primary side winding of the switched mode power supply and the second power receiving antenna may comprise a coil or coils spaced with said primary side winding so as to receive a leakage flux of the primary side winding. In this implementation, the transmit side of the wireless power transfer transformer reuses an existing inductive winding to reduce the number of additional components needed.

The invention also provides a lighting system, comprising:
a lighting unit of the invention; and
an external sensor,
wherein the external sensor comprises a radio frequency tag, and a contact arrangement adapted to contact to the contact interface of the lighting unit, for connecting the tag to the contact interface and for coupling the radio frequency tag to the second radio frequency antenna of the lighting unit.

The external sensor may comprise a power source so that the sensor can be active (so that the power source provides all the required power for sensor operation) or it can be semi-passive (so that the power source is recharged by power transfer from the lighting unit).

The external sensor may instead comprise a passive sensor. In the case of a passive sensor, wireless power transfer from the lighting unit can be employed, for example making use of the inductive coupling between the first and second radio frequency antennae.

The invention also provides a lighting system, comprising:
a lighting unit of the invention; and
an external sensor,
wherein the external sensor comprises a radio frequency tag, a contact arrangement for connecting the tag to the contact interface, and a wireless power receiver module,
wherein the contact arrangement comprises third contacts adapted to connect to the contact interface of the lighting unit for coupling the radio frequency tag to the second radio frequency antenna and fourth contacts for coupling the wireless power module to the second power receiving antenna.

This arrangement uses an external sensor with separate input for receiving wireless power transfer and output for providing sensor information.

When the external sensor further comprises a rechargeable battery, a semi-passive approach is provided, with dedicated input for recharging the battery.

The sensor may for example comprise: a light sensor; or an occupancy sensor; or a temperature sensor.

Based on the above embodiment of coupling the antenna with the switch mode power supply or using the existing winding of the switch mode power supply, in another aspect of the invention, it proposes innovation in the field of wireless power transfer. The inductive power transfer system uses the principle of electro-magnetic induction, and two winding are electro-magnetically coupled together. One winding operates as a power transmitter and has power flowing through, the other winding would obtain inductive power and operates as a power receiver. A more detailed introduction of the inductive power transfer can be found in US20140232201A1.

In case of the inductively powering a load by a luminaire, a traditional way is having two set of power system: one power system is for powering the lighting load and the other system is for powering the transmitter winding/antenna. This needs separate components and the cost is high.

To better address this concern, the aspect of the invention proposes an integration of a power transmission antenna with a switch mode power supply of a driver, thus one power system can provide power for both the load and the power transmission antenna.

In an aspect, it provides a driver comprising a switched mode power supply, wherein said switched mode power supply comprises an existing coil, the driver circuit further comprises: a first power transmission antenna formed as a first coil which is either the existing coil of the switched mode power supply or coupled to the existing coil of the switched mode power supply, and said first power transmission antenna is adapted for being magnetically coupled to a second power receiving antenna thereby forming a wireless power transmitter.

By re-using the existing coil of the switched mode power supply or coupled to the existing coil of the switched mode power supply, the first power transmission antenna is integrated with the driver and the switch mode power supply can power both the load and the power transmission antenna. There is no need to use an extra power system for the inductive power transfer, and the cost the saved.

In a further embodiment, the switched mode power supply comprises a flyback converter including a transformer which has a primary side winding and a secondary side winding. It should be understood that other types of switched mode power supply is also applicable for integrating the power transmission antenna. For example, the power inductor of buck converter, boost converter or buck-boost converter can also serve as the power transmission antenna, or the power transmission antenna can coupled to the power inductor so as to obtain power during the active powering duration or during the passive freewheeling duration. Said active powering duration means the power source powers/charges the power inductor, and said passive freewheeling duration means the power inductor discharges/releases the charged power.

In a still further embodiment, said first coil is in parallel with the primary side winding and said second power receiving antenna comprises a second coil magnetically coupled with the first coil.

This embodiment gives a more detailed embodiment in which the power transmission antenna is in parallel with the primary side winding, and can obtain power from the power source directly.

In an alternative embodiment, the first power transmission antenna comprises the primary side winding and the second power receiving antenna comprises a coil spaced with said primary side winding so as to receive a leakage flux of the primary side winding.

This embodiment re-uses the primary side winding as the first power transmission antenna to transmit power via the leakage flux of the primary side winding. Cost is further saved.

To provide enough leakage flux, a further embodiment provides an improved magnetic core for the transformer. Said core is magnetically conductive at the inner side and has an air gap at the outer side, and the outer side is adapted to couple an additional core on which said second coil is winded. In this embodiment, the air gap can provide enough leakage flux.

In another embodiment, the first coil of the first power transmission antenna coupled to an output terminal of the secondary side winding and adapted to receive power output from the secondary side winding. Alternatively, the first coil of the first power transmission antenna coupled to an output terminal of the flyback converter.

In this embodiment, the first power transmission antenna is moved from the primary side to the secondary side. Since the power output at the secondary side can be regulated by the switch mode power supply, power factor and efficiency of the inductive power transfer can also be improved.

In the above embodiment, the power on the first power transmission antenna depends on the output of the secondary side winding. In case the output of the secondary side winding varies, the power for the inductive power transfer also varies. To couple this issue and provide a constant power on the inductive power transfer, the driver further comprises: at least one additional coil in series with said first coil; at least one short circuiting switch, each of which in parallel with a respective one of said least one additional coil; and a control circuit coupled to said short circuiting switch, for controlling said switch to short circuit the respective additional coil, according to the power output by the secondary side winding and the power required to be transmitted to the second power receiving antenna.

In this embodiment, the additional coil can act as power divider to adjust the ratio of the power on the first coil and the overall power. Thus in case the overall power output by the secondary side winding changes, the additional coils can be switched in or out so as to keep the power on the first coil constant.

In more details, the control circuit further comprises a sensing element adapted to sense the power provided by said secondary side winding; and wherein said control circuit is adapted to: short circuiting the at least one additional coil if the sensed power provided by said secondary side winding is below a limit; or short circuiting the at least one additional coil if power required to be transmitted is above a threshold.

In this embodiment, when the output at the secondary side is too low, such as the driver is tuned/dimmed down, or when the inductive power transfer needs extra power than normal, such as the second coil needs to charge an extra battery, additional coils will be short circuited such that a larger ratio of power from the secondary side winding is delivered to the inductive power supply.

In an alternative embodiment, the first power transmission antenna is moved back to the primary side. More specifically, said flyback converter further comprises: a freewheel loop coupled across the primary side winding, said freewheel loop is adapted to freewheel the energy in the primary side winding; and the first coil of the first power transmission antenna is in the freewheel loop.

In current flyback converters, freewheeled energy is normally snubbed by a snubber circuit. In this embodiment, the freewheeled energy of the primary side winding can be re-used in the first power transmission antenna thus improves the power efficiency. In a further embodiment, said freewheel loop comprises: a diode forwarded from the current out-flowing end of the primary side winding; a capacitor between the diode and the current in-flowing end of the primary side winding; and said first coil is in parallel with said capacitor.

This embodiment provides a more detailed circuit for utilizing the freewheeled energy of the primary side winding.

In a further embodiment, said freewheel loop further comprises: a resistor in parallel with said capacitor and said first coil; and a switch adapted to selectively switch either of the first coil or the resistor into the freewheel loop.

This embodiment can select either to transfer the freewheeled energy or to snub it.

In one example, said driver is for driving an LED arrangement. And the embodiment of the invention also provides a luminaire comprising a driver according to the above example and an LED arrangement driven by said driver.

Further, the embodiment of the invention also provides a sensor system comprising: a luminaire according to the above embodiment; and a sensor comprising said second power receiving antenna. The sensor is powered via the inductive power transfer.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a lighting unit having a light source controller, a first radio frequency antenna and a second radio frequency antenna all provided within (or on) a housing of the lighting unit. A contact interface at the outer surface of the housing comprises (first) contacts which are electrically connected to the second radio frequency antenna. A reader circuit processes signals received from an external sensor when the sensor is electrically connected to the contact interface. This arrangement separates a circuit part and an antenna part of an RF sensor. The antenna part is formed as part of the lighting unit housing whereas the circuit part is provided by the external sensor. This means that standard RF protocols (e.g. RFID or NFC) can be used by sensors which are physically (rather than wirelessly) electrically connected to the lighting unit. This provides a modular approach which enables different sensors to be used.

Figure 1:
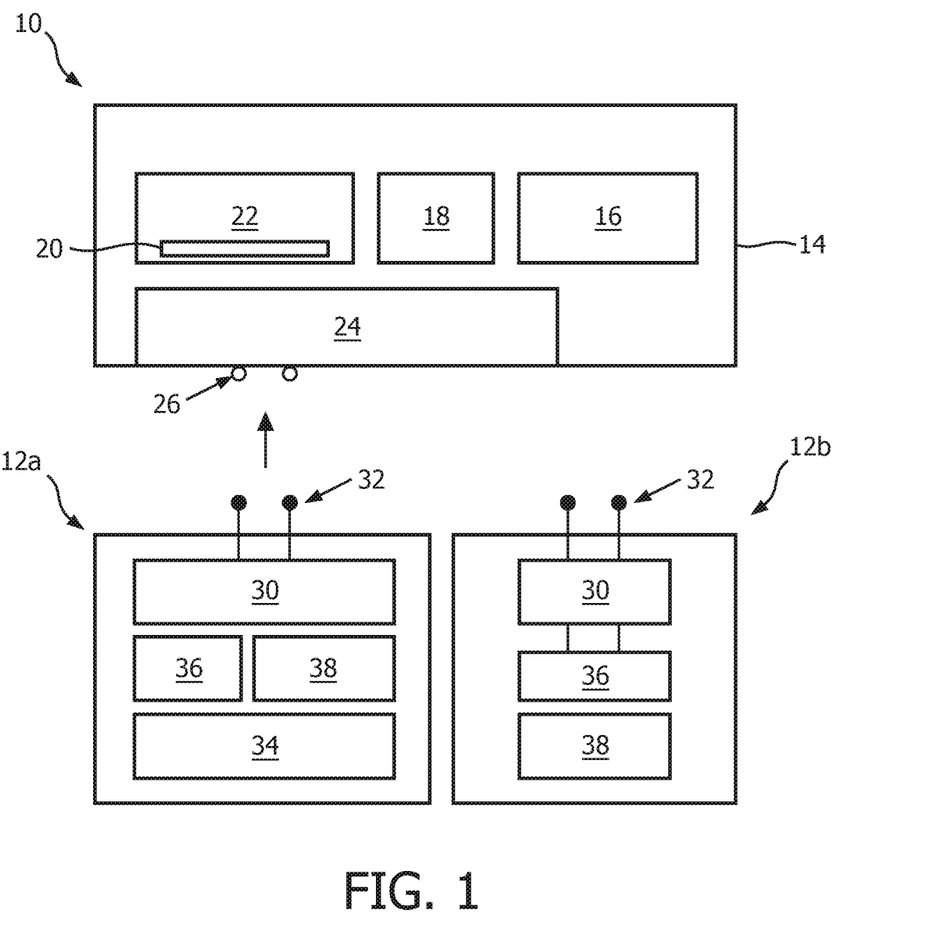
FIG. 1 shows a first example of lighting system with two possible types of sensor.

FIG. 1 shows a block diagram of an example of the lighting system.

The system comprises a lighting unit 10 and a sensor 12*a* or 12*b*. The lighting unit 10 has an outer housing 14 with a light source arrangement 16 such as an LED arrangement within the housing. A light source controller 18 is within the housing.

An RF communication antenna 20 is provided within the housing and this is part of a reader circuit 22, for example a near field communication (NFC) reader circuit. The NFC reader circuit can be a standard component for example as now frequency used in NFC smart phones.

A second radio frequency antenna 24 is provided within or on the housing, for example embedded within the housing 14. This can also be an RFID or NFC antenna.

In the examples below, reference is made generally to near field communication ("NFC") components, since the communication distances are short and of the same order of magnitude as the dimensions of housing of the lighting unit. Typically, NFC systems are designed for communication over distances of the order of centimeters, for example around 10 cm or less, and such communications systems can be employed for the wireless communications in this system. RFID systems have a range which is dependent on the frequency used, and again it may be as low as 10 cm or less, or it may be much greater. The invention can be implemented generally using any radio frequency communications protocols, but the low cost of short range RFID or NFC communications components makes them particularly attractive for this application.

The first and second antennae 20, 24 communicate sensor data between them.

A contact interface is provided at the outer surface of the housing which comprises first contacts 26 which are electrically connected to the second near field communication antenna 24. The location of the antenna 24 is determined for an optimal communication performance with the antenna of the NFC reader circuit 22.

The NFC reader circuit 22 is for processing signals received from the external sensor 12*a*, 12*b* when the sensor is electrically connected to the contact interface.

The external sensor 12*a* or 12*b* comprises a tag part 30 which is the circuit of the sensor, whereas the communication antenna of the sensor 12*a* or 12*b* is the antenna 24. Thus, the antenna and tag chip are separable by the electrical contact interface including the first contacts 26. The sensor has its own connector arrangement (comprising contacts 32) for connecting to the first contacts 26 of the lighting unit contact interface.

This approach provides modular design and enables an easily expandable sensing function. A passive or semi-passive sensor 12*a* or 12*b* with a built-in NFC tag chip (but no antenna) can be attached to the luminaire to provide connection to the antenna of the tag. The lighting unit reads the sensing data from the sensor via its built-in NFC reader circuit 22.

FIG. 1 shows two possible examples of sensor.

The sensor can be a semi-passive sensor 12*a* with an internal energy source 34 such as a battery or solar cell, which provides power mainly for the sensing function.

Alternatively, the sensor can be a passive sensor 12*b* which receives enough energy from the reader's RF signal for both the sensing function and for communication.

In each case, the external sensor has a controller 36 and a sensing module 38. In the case of the passive sensor 12*b*, there is power and data communication between the controller 36 and the tag 30 as shown by the two connections between the two units.

The controller is for example an ultra low power microcontroller unit (MCU) which communicates with both the sensing module 38 and the NFC tag 30. For simple applications such as temperature sensing, the communication with the sensing module 38 can be realized by the processing unit of the NFC tag 30, thus eliminating the need of a separate controller 36, and the control function is part of the tag itself.

The NFC tag 30 has two interfaces, a contactless interface to the NFC reader 22 in the lighting unit (by means of the antenna 24), and a wired interface to the controller 36 or the sensing module 38 if no separate controller is used.

In the case of the passive sensor 12b, the NFC tag 30 can harvest enough energy through the connected antenna 24 from the RF field of the NFC reader 22 to power both the operation of the tag and the controller and sensing module. Such NFC tags are widely available, for example the M24LR16E-R from STMicroelectronics is a NFC/RFID tag integrated circuit with an I2C interface and an ISO 15693 RF interface, which can harvest energy from RF signals emitted by NFC/RFID readers and convert into a voltage output to power other electronic components.

The NFC tag 30 is connected (by physical wires) to the contacts 32, which are used to attach the sensor to the lighting unit. When the external sensor is attached to the luminaire, i.e., the two connectors are contacted, the NFC tag is linked to the antenna 24 embedded in or provided on the cover of the lighting unit so that the tag is readable by the NFC reader 22.

Another benefit of separating the antenna 24 from the sensor tag, i.e., putting the antenna in or on the cover of the luminaire, is that significantly more area is available for the antenna meaning more energy can be harvested from the RF field.

The semi-passive sensor 12a further contains an internal power source 34, which could be a battery or an energy harvest device such as solar cell. The power source mainly provides energy to the controller 36 and/or the sensing module 38. The NFC tag 30 can optionally use the power source for sending the signal to the NFC reader 22 so that an enhanced communication performance can be achieved. The semi-passive sensor may optionally also use energy harvested by the NFC tag to power the controller or the sensing module to achieve an extended battery life.

A further option is to increase the amount of the harvested energy to the level that it can be used to charge the battery or directly power the sensor module and controller. In this way, a semi-passive sensor is turned into a passive sensor. This can be realized by using wireless power technologies such as inductive charging.

Figure 2:
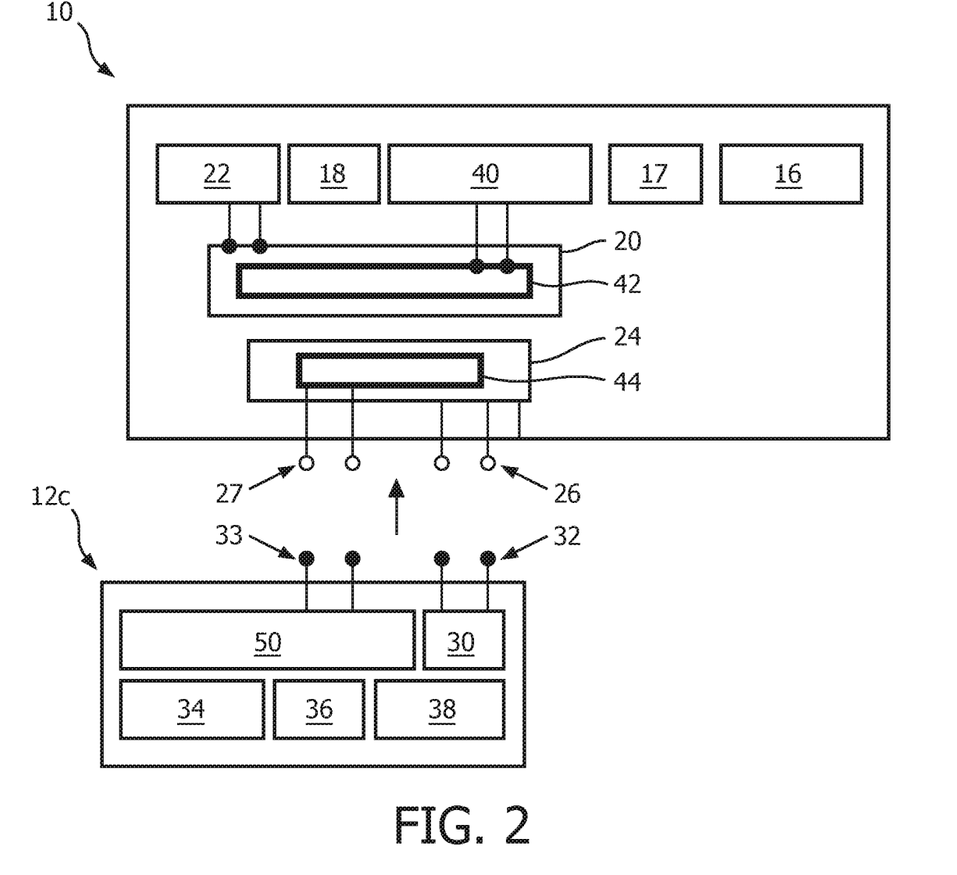
FIG. 2 shows a second example of lighting system.

The functions of data communication and wireless power transmission can be separated as shown in FIG. 2.

The same reference numbers are used for the same components and the description is not repeated. For completeness, an LED driver 17 is shown as a separate component to the LED source 16. The NFC reader 22 is also shown separate to the NFC reader antenna 20.

There are four antennae in the lighting unit 10. The first and second antennae 20,24 provide data communication between the reader 22 and the sensor 12c. A wireless power transmitter module 40 is added in the lighting unit 10. The wireless power transmitter 40 receives DC power from the LED driver 17 to input an alternating current in a third antenna in the form of a power transmission coil 42. This generates a magnetic field between the power transmission coil 42 and a power receiving coil 44 (a fourth antenna) which induces a voltage in the power receiving coil 44.

The wireless power transmitter 40 contains a driver circuit for regulating the current flowing through the power transmitter coil, and a controller for circuit control and communication with wireless power receivers during power transmission. For example, there is control for starting and stopping the power transmission, also for authentication such as a compatibility check between the transmitter and receiver.

As for the NFC antenna 24 of the external sensor, the power receiver coil 44 may be embedded in the cover of the lighting unit and physically connected (through wires) to the connector located on the outer surface of the cover. Thus, the lighting unit has a first power transmission antenna 42 within the housing connected to the wireless power transmitter module, and a second power receiving antenna 44 provided within or on the housing.

At the sensor side, a wireless power receiver module 50 is added which contains a rectifier for AC to DC conversion, a voltage conditioner (e.g., a DC/DC converter) for the delivery of a voltage with proper level and characteristics to the load (e.g., the sensor module or battery), and a controller for circuit control and communication with the wireless power transmitter during power transmission.

The sensor has two sets of contacts 32,33 forming its contact arrangement and the lighting unit has two corresponding sets of contacts 26,27 forming its contact interface. Thus, the lighting unit contact interface comprises first contacts 26 and second contacts 27 which are electrically connected to the second NFC antenna 24 and the second power receiving antenna 44 respectively. The sensor contact arrangement comprises third contacts 32 and fourth contacts 33.

When the sensor is attached to the luminaire, i.e., all four contacts are contacted (as two connected pairs), the NFC tag 30 and wireless power receiver 50 are linked to the NFC antenna 24 and power receiving coil 44 embedded in (or provided on) the cover of the lighting unit respectively. This sets up not only the communication link between the NFC reader 22 and the NFC tag 30, but also the power transmission link between the wireless power transmitter 40 and receiver 50.

If the sensor uses an internal rechargeable battery, then the wireless power receiver 50 will manage the charging of the battery. If no battery is used, then the wireless power receiver will power the sensing module 38 and the controller 36 directly.

Figure 3:
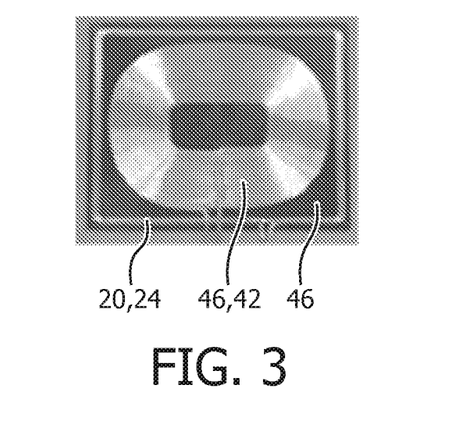
FIG. 3 shows an antenna coil arrangement.

FIG. 3 gives an example of how to arrange the NFC antennae 20,24 and the charging coils 42,44 on a shared magnetic plate. The power transmit coil and the power receive coil are be tightly coupled to ensure an efficient wireless power transfer.

The coils for wireless power transmission can be implemented using existing coils, in particular coils which already exist as part of the LED driver circuits. For example a down converting transformer is often used as part of an LED driver.

Figure 4:
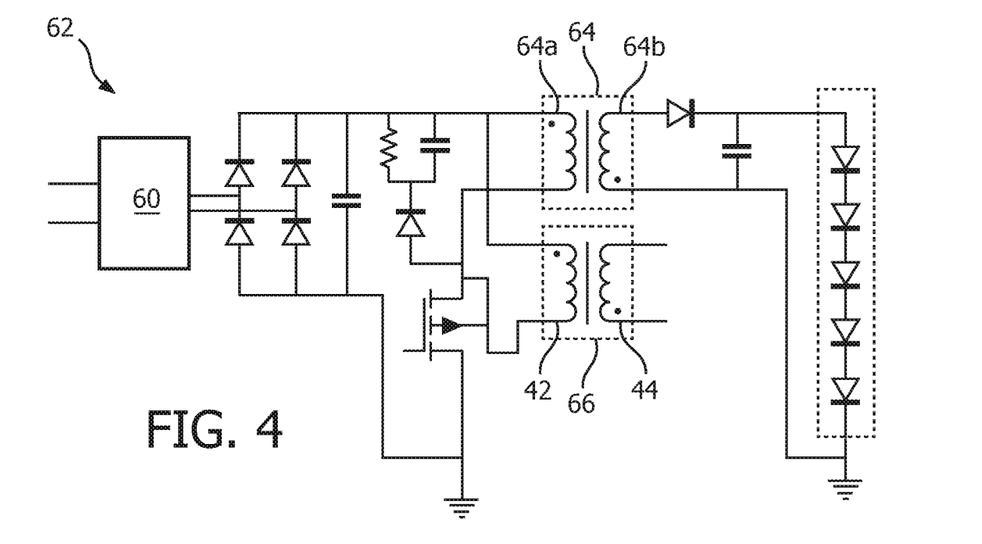
FIG. 4 shows one possible circuit arrangement to provide power transmission coils using an existing LED driver transformer.

FIG. 4 shows an example of reusing an LED driver with a typical flyback topology.

The circuit comprises an EMI (electromagnetic interference) filter 60, a rectifier 62 and a main down converting transformer 64 with a primary winding 64a and a secondary winding 64b. A flyback circuit including a main switch and flyback diode is provided at the input side of the transformer 64.

An additional coreless transformer 66 is added into the LED driver with its primary side winding, which functions as the power transmission coil 42, connected in parallel with the primary winding 64a of the main transformer 64. In this way, the LED driver circuits can be reused to input and regulate an alternating current to the primary winding 42 of the coreless transformer, thus eliminating the need for a separate driver circuit for the wireless power transmitter 40.

The secondary side winding of the coreless transformer 66 is the power receiver coil 44. In this example, the winding 66 comprises a coil or coils connected reverse dotted with respect to the primary side winding. Therefore the secondary side winding 44 of the coreless transformer is positioned outside of the LED driver, for example on the cover of the lighting unit in such a way that a good space coupling with the primary side winding is achieved.

Figure 5:
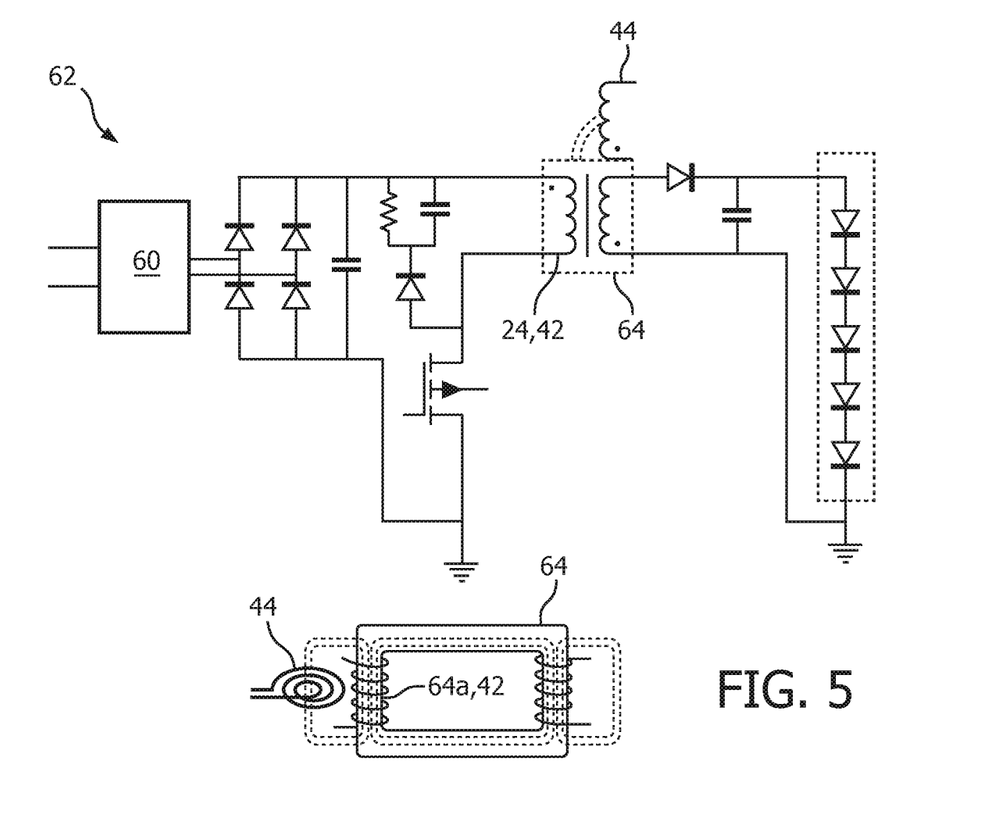
FIG. 5 shows anther possible circuit arrangement to provide power transmission coils using an existing LED driver transformer.

FIG. 5 shows another example of how to reuse a flyback LED driver to a further extent.

The primary winding of the main transformer 64 of the LED driver is reused as the power transmission coil 42. The power receiver coil 44 is placed with good coupling with the main transformer to fully utilize the leakage magnetic flux from its primary winding. This may require special design of the main transformer 64 according to the requirements of both the main lighting function and the wireless power transmission function.

FIGS. 4 and 5 show a typical constant current controlled flyback converter. However, this is just one of many possible topologies of switched mode power supply which can be used within an LED driver circuit. More generally, the first power transmission antenna can be formed as a coil which is either in the switched mode power supply (i.e. an existing coil of the switched mode power supply) or coupled to an existing coil of the switched mode power supply. The second power receiving antenna is magnetically coupled to the first power transmission antenna, and this may be across an air gap or a magnetic material.

To better elucidate the above aspect of the invention about the integration of power transmission antenna with driver, the description would give more detailed embodiments and discussions.

Figure 6:
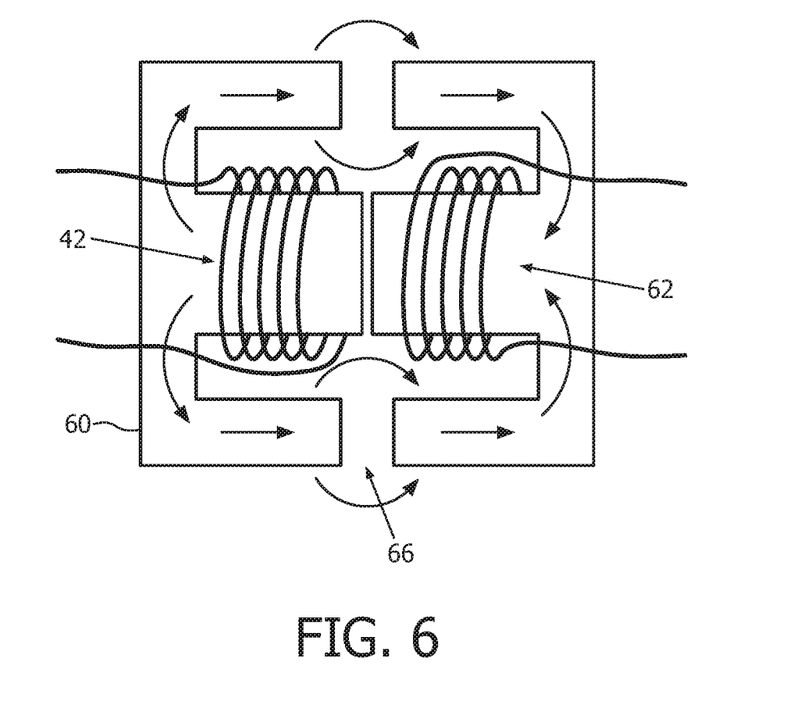
FIG. 6 schematically shows the transformer with a core to be used in the embodiment as shown in FIG. 5.

Based on the embodiment of FIG. 5 wherein the primary side winding serves as the power transmission antenna, in order to provide enough leakage flux, the embodiment as shown in FIG. 6 provides an improved magnetic core 60 for the transformer 64. The primary side winding 42 and the secondary side winding denoted as 62 are winded on the core 60, wherein the core is magnetically conductive at the inner side and has an air gap 66 at the outer side. The core can be formed by oppositely attaching two E-shaped half-cores together, wherein the middle leg of the E-shaped core is longer than the side legs. The arrows in the FIG. 6 schematically show the magnetic flux.

Figure 7:
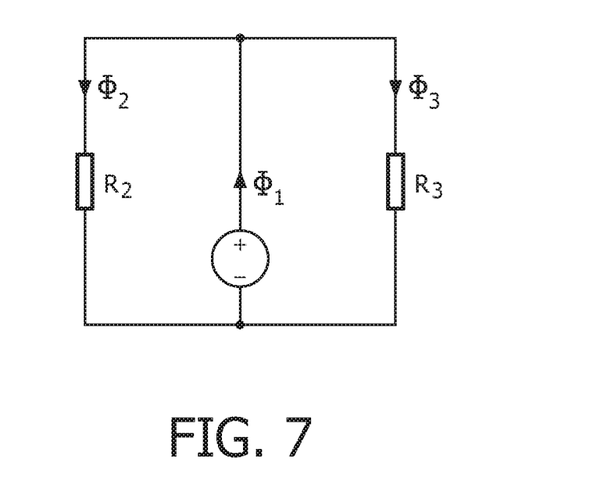
FIG. 7 shows the magnetic reluctance circuit diagrams of the transformer of FIG. 6.

FIG. 7 shows the magnetic reluctance circuit diagrams of the transformer of FIG. 6. Air gaps in transformer core increase the reluctance of the magnetic circuit, and enable it to store more energy before core saturation. Magnetic reluctance is analogous to resistance in an electrical circuit, but rather than dissipating electric energy it stores magnetic energy. Like the way an electric field causes an electric current to follow the path of least resistance, a magnetic field causes magnetic flux to follow the path of least magnetic reluctance. $R_2$ and $R_3$ represent the two air gaps of the proposed transformer. $\Phi_1$ is the magnetic flux of the magnetic field created by the primary winding of the transformer. For the new transformer, magnetic energy is distributed among $R_2$ and $R_3$ and the sum of $\Phi_2$ and $\Phi_3$ should equal to $\Phi_1$.

Figure 8:
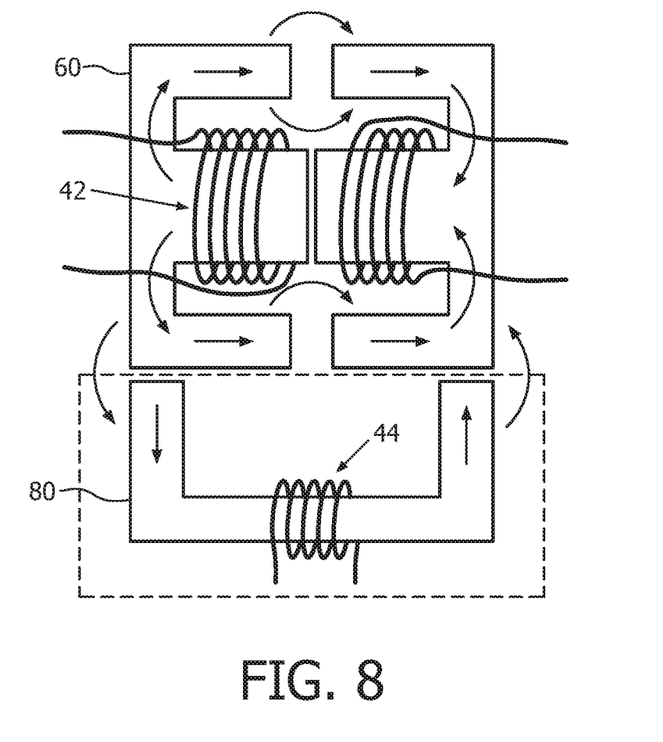
FIG. 8 schematically shows the coupling between the second power receiving antenna with the transformer as shown in FIG. 6.

FIG. 8 shows how an additional core 80, on which said second coil 44 is winded, is coupled to the core 60. The outer side of the core 60 with the air gap is adapted to couple an additional core 80 on which said second coil 44 is winded. As the additional winding (the C-shape core) is put close enough to the transformer, it is coupled to the primary winding of the transformer acting as an extra secondary winding. As the load of the additional winding, sensor can get energy wirelessly from the transformer.

Figure 9:
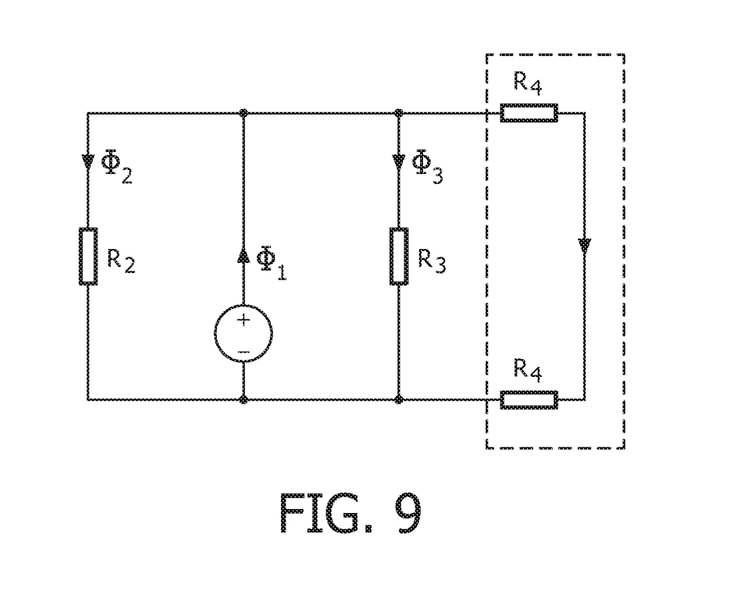
FIG. 9 shows the magnetic reluctance circuit diagrams of the transformer with the second power receiving antenna of FIG. 8.

FIG. 9 shows the magnetic reluctance circuit diagram of the transformer setup of FIG. 8. Due to the existence of the two air gaps ($R_2$ and $R_3$) on the two side leg paths of the EE cores and the two newly created air gaps (i.e., $R_4$) in between the EE cores and the coupled C core, magnetic fluxes are redistributed depending on the magnetic reluctance of each path. $\Phi_1$ is still the magnetic flux of the magnetic field created by the primary winding. The path of $R_4$-$R_4$ works as a parallel circuit to the path of $R_2$ and $R_3$. Magnetic energy is redistributed among $R_2$, $R_3$ and $R_4$ and the sum of $\Phi_2$, $\Phi_3$ and $\Phi_4$ is equal to $\Phi_1$.

The quantity of the magnetic flux flowing through the C-shape core determines the amount of energy transferring to the sensor. This can be adjusted by changing the size of the two air gaps between the EE core and the C core. Larger gaps means larger magnetic reluctance (i.e., $R_4$) on the path leading to less magnetic flux flowing through, therefore less power can be transferred.

Figure 10:
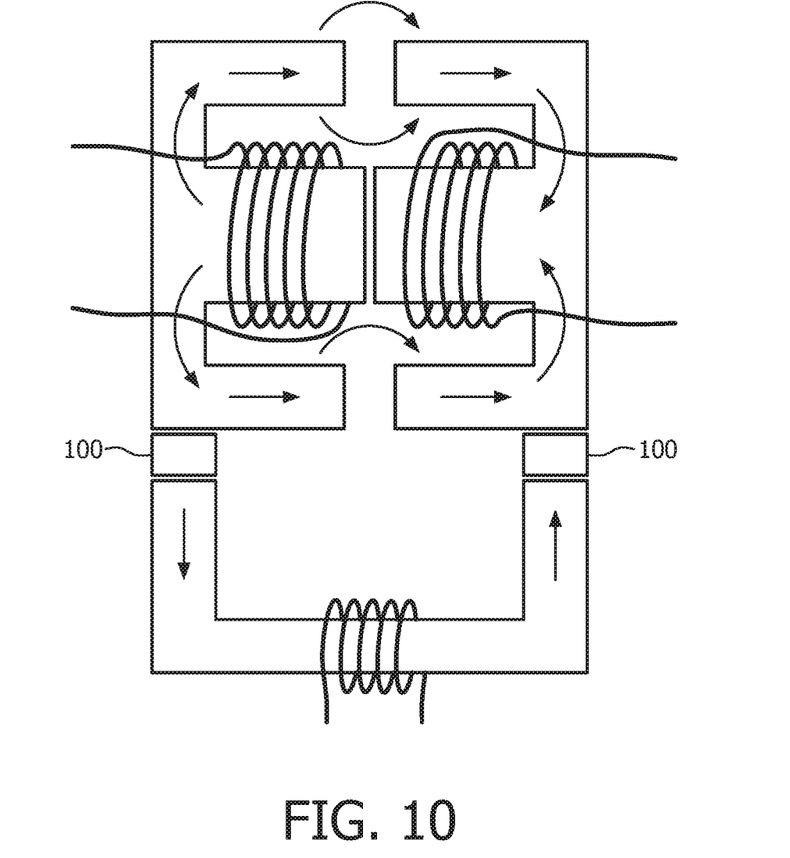
FIG. 10 schematically shows an embodiment for improving the coupling as shown in FIG. 8.

It must be noted that the air gap between the transformer and the external core must be small enough to allow energy transfer. Too large magnetic reluctance due to big air gaps will block the flowing of magnetic flux into the external core. In practical applications, the casing of luminaires and sensors can easily reach 2 mm which is big enough to block magnetic flux. This could be solved by embedding magnetic materials 100 in the casing to extend the allowed distance between the transformer and the external core, as illustrated in FIG. 10. Using materials of different magnetic permeability has the same effect of adjusting the size of the air gap.

Back to the flyback converter as shown in FIG. 4, the diode and a parallel of a resistor and a capacitor, across the primary side winding 64a, is a loop that freewheels the energy in the primary side winding when the power switch turns off. This loop is also known as snubber. The embodiment of the invention proposes utilizing the freewheeled energy for inductive power transfer, so as to save energy.

Figure 11:
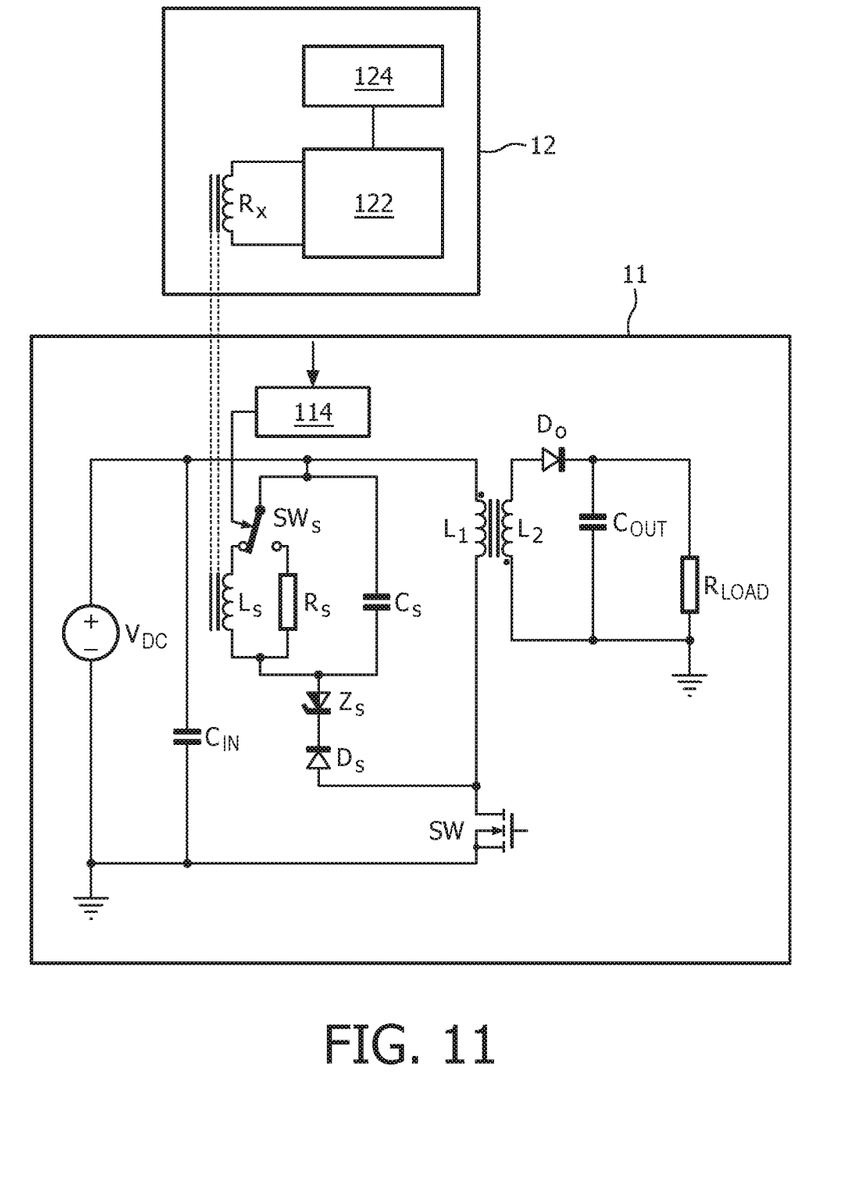
FIG. 11 schematically shows the topology of the driver with the first power transmission antenna in a freewheel loop at the primary side.

An embodiment of a luminaire 11 and an inductive power receiving device is shown in FIG. 11, wherein the luminaire comprises the driver with the first power transmission antenna Ls and the inductive power receiving device comprises the second power receiving antenna Rx. The power transmission antenna Ls is in the freewheel loop, and is parallel and alternative with the snubber resistor Rs.

A relay controller 114, which could be an internal module of the flyback converter or a separate module of the luminaire, keeps monitoring the existence of external devices attached to the luminaire and controls the relay switch SWs accordingly. Normally, the relay switch SWs connects the resistor into the snubber circuit when there is no external device attached, so as to snubber the freewheeled energy in the primary side winding. When an external inductive power receiving device 12 is mechanically attached on the (casing of the) luminaire as illustrated in FIG. 11, the relay controller 114 detects this and controls the relay switch SWs to connect the inductor Ls into the snubber. Various methods could be used to detect the sensor, such as using a mechanical structure. The external inductive power receiving device 12 contains a wireless power receiver module of which the second power receiving antenna, namely a coil Rx is coupled with the inductor Ls in snubber circuit. The inductive power receiving device 12 may further comprises a rectification and voltage/current correcting part 122 that converts the received power to a proper characteristic so as to power the load 124.

A zener diode $Z_s$ connected in series with the diode $D_s$ and the antenna Ls/resistor Rs to block the reverse voltage reflected from the secondary side, so that only the freewheeled power is allowed to flow into the capacitor $C_s$.

The capacitor $C_s$ can further resonate with the inductor Ls such as alternating current occurs on the inductor Ls and power is transferred.

It should be understood that the above resistor Rs, relay switch SWs and the relay controller 114 are dispersible such that all freewheeled energy can be directly transferred.

In above embodiments, the first power transmission antenna locates in the primary side. The below embodiment would provide the first power transmission antenna in the secondary side.

Figure 12:
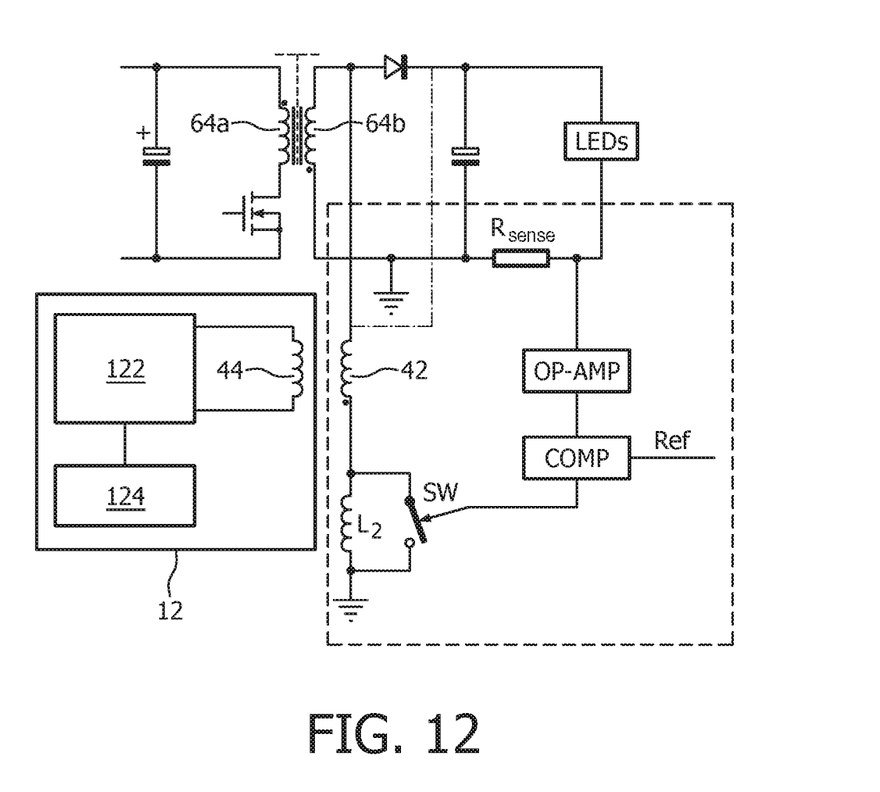
FIG. 12 schematically shows the topology of the driver with the first power transmission antenna at the secondary side.

FIG. 12 shows a luminaire with a driver and an external power receiving device 12. As shown in FIG. 12, the first coil of the first power transmission antenna 42 coupled to an output terminal of the secondary side winding 64*b* and adapted to receive power provided from the secondary side winding 64*b*.

As shown in FIG. 12, the driver comprises at least one additional coil L2 in series with said first coil 42, at least one short circuiting switch SW, each of which in parallel with a respective one of said least one additional coil L2; and a control circuit coupled to said short circuiting switch SW, for controlling said switch to short circuit the respective additional coil L2, according to the power output by the secondary side winding 64*b* and the power required to be transmitted to the second power receiving antenna 44.

When the MOFSET switch is closed, the primary side winding 64*a* is connected to the input voltage source, namely the input capacitor. The current in the primary side winding and magnetic flux in the transformer increases, storing energy in the transformer. The secondary winding 64*b* and the inductors 42 and L2 forms a closed circuit. The voltage induced in the secondary winding is negative (at the upper terminal of second side winding 64*b*), so the rectifier diode is reverse-biased. The negative voltage generates a negative current in the closed circuit that is from winding 64*b*, ground, inductor L2, and power transmission 42, storing energy in the inductors L2 and 42. When the MOSFET switch is opened, the current of the primary side winding 64*a* is stopped. The voltage of the secondary side winding 64*b* reverses to become positive (at the upper terminal), forward-biasing the rectifier diode, allowing current to flow from the secondary winding to the rectifier diode. In the mean time, there is a current flowing from the inductors L2 and 42 to the rectifier diode. The energy from both the transformer core and the two inductors recharges the output capacitor and supplies the load. Through the above two operations, if a second power receiving antenna 44 is attached to the luminaire with its second coil 44 coupled with the first power transmission antenna 42, there will be wireless power transmission from the antenna 42 to the second coil 44. The inductors 42 and L2 is the output of the transformer to store energy during the MOSFET switch is closed and discharge energy to the load when the MOSFET switch is opened. Adding of these inductors won't affect the normal working of the flyback converter.

In an alternative embodiment, the first power transmission antenna can be coupled to the output of the flyback converter, instead of to the output terminal of the second side winding. In this case, the power transmission antenna 42 can be deemed as another load in parallel with the LEDs load of the LED luminaire. The connection can be shown by the dash-dot line in FIG. 12, which is to the anode of the rectifier diode.

In the above embodiments, the power on the power transmission antenna 42 depends on how much power the driver provides at the secondary side. The driver is normally controlled according to the LEDs' load requirement, and when the load requirement does not in accordance with the power required to be transferred on the power transmission antenna 42, the external device 12 may not be powered properly. To address this concern, the embodiment uses the inductor L2, the switch SW and the control circuit comprising the resistor Rsense, the amplifier OP-AMP and the comparator COMP.

The control circuit keeps monitoring the power requirement of the LED load by measuring and amplifying the current of the resistor $R_{sense}$ and comparing with a pre-set reference value REF. When the power requirement from the LED load is below a certain level, leading to the energy in the inductor 42 is not enough to wirelessly power an attached external device, the switch of the control circuit will be closed to short-circuit L2 so that the more energy is allocated to 42. This way, more energy is available for transmitting wirelessly to the external device. If the inductance of L2 is N times of the antenna 42, then the closing of the switch will bring N times more energy to the antenna 42.

Alternatively, in case the external device needs a short-term large power, such as to charge its internal battery or do excessively power-consuming operation, the switch of the control circuit will be closed to short-circuit L2 so that the more energy is allocated to 42.

The inductance of 42 and L2 are chosen based on the parameters of the flyback converter, such as the output power, to properly allocate energy among the two inductors so that they won't be saturated when the converter is working at full its output power.

Figure 13:
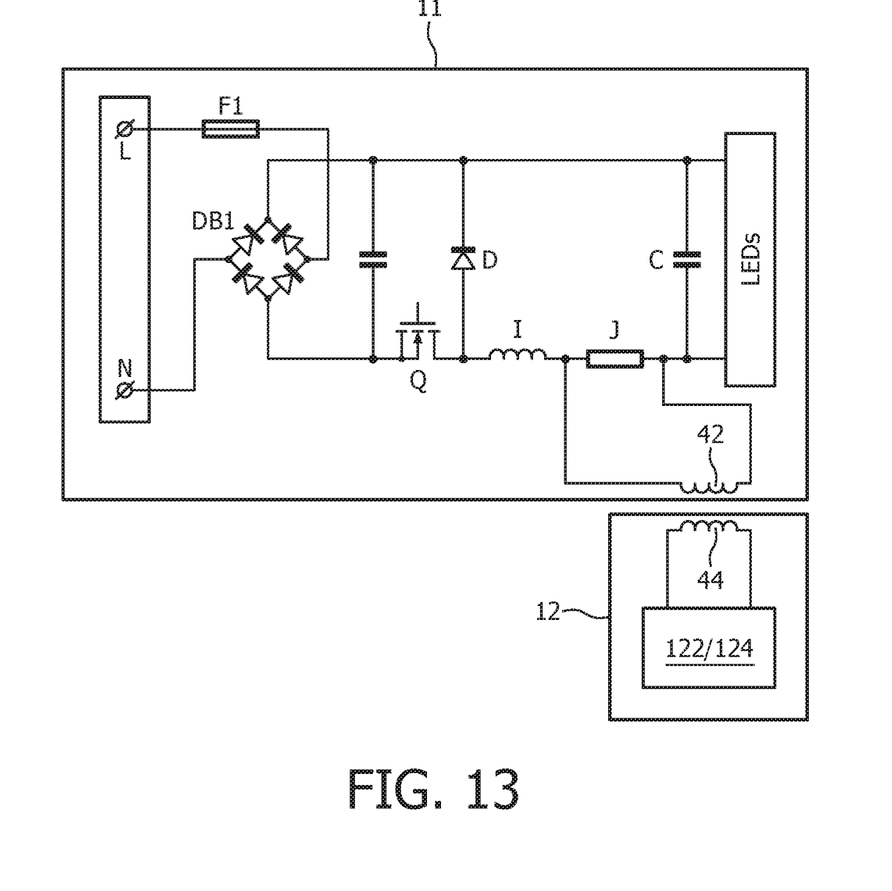
FIG. 13 schematically shows an embodiment of the driver with the first power transmission antenna in series with a power inductor/coil of a buck converter.

The embodiment of the invention can also be applied to other converter types. FIG. 13 shows an example wherein a buck converter is integrated with the first power transmission antenna 42. As shown in detail in FIG. 13, a first power transmission antenna 42 is in series with the existed power inductor/coil I of the buck converter. A jumper J is placed in parallel with the power transmission antenna 42 and the jumper J is used for short circuiting the power transmission antenna 42 and forming the buck loop, in case the power transmission is not needed. The power transmission antenna 42 can receive power in either or both of the power storing phase and the power releasing phase of the power inductor I.

By way of first example, the sensor can be a low power temperature sensor such as the LM20 of Texas Instruments (Trade Mark). When the passive sensor is attached to the intelligent lighting unit, it can communicate through the NFC interface to provide the temperature information. The controller in the lighting unit sends a request through the NFC reader to the passive sensor. When a request is received by the passive through its NFC interface, the NFC tag in the passive sensor forwards the request to the sensor controller through its wired interface.

When a request is received by the sensor controller of the passive sensor, the the temperature data is extracted from the sensing module and this is written to the memory unit (e.g., EEPROM) of the NFC tag 30 through the wired interface.

The NFC tag 30 sends the data stored in its memory unit back to the NFC reader 22 of the lighting unit through the NFC interface.

By way of second example the sensor can be a rechargeable battery powered occupancy sensor such as The "OccuSwitch" (Trade Mark) of Philips (Trade Mark). When the sensor is attached to the intelligent lighting unit, energy efficient lighting control is achieved.

The wireless power receiver 50 of the sensor manages the charging of the battery. When there is a need to charge the battery (e.g., the energy level of the battery is below a threshold), it communicates with the wireless power transmitter 40 to start wireless power transmission.

The sensing module of the sensor keeps monitoring the activities in the specific area and sends the status (i.e., occupied or empty) to the sensor controller 36, which then write the status in the memory unit of the NFC tag 30 through the wired interface.

The controller 18 of the lighting unit periodically reads the status of the activity through the NFC reader 22, which communicates with the NFC tag 30 of the sensor via the NFC interface. Based on the status of activity, the light source controller 18 turns on and off the light source.

As will be clear from the examples above, the external sensors may sense conditions relating to lighting, such as light sensors or proximity sensors. However, they may also sense conditions which relate to other aspects of the control of the environment, such as temperature. For example, the lighting system may be part of an overall system infrastructure which provides intelligent sensing and control not only of lighting. The lighting system can be part of a larger network which reports to a central system and receives instructions from that central system.

In addition to coupling sensors to the lighting system, other devices can be coupled simply for the purposes of charging them. Thus, the contact interface on the housing can function as a charging docking station.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A driver comprising:
    a switched mode power supply adapted to be electrically coupled to a load ($R_{load}$) and provide power supply to the load ($R_{load}$), wherein said switched mode power supply comprises an existing coil, wherein said existing coil is a power inductor of the switched mode power supply which power inductor has an active powering duration and a passive freewheeling duration so as to provide power supply to the load ($R_{load}$),
    the driver circuit further comprises:
    a first power transmission antenna formed as a first coil which is coupled to the existing coil of the switched mode power supply,
    said first power transmission antenna is adapted for being magnetically coupled to a second power receiving antenna external to said driver and different from the load ($R_{load}$), thereby forming a wireless power transmitter, and
    wherein a jumper is placed in parallel with the first power transmission antenna and used for short circuiting the first power transmission antenna, when a power transmission from said first power transmission antenna is not required.

2. A driver as claimed in claim 1, wherein the switched mode power supply comprises a flyback converter including a transformer which has a primary side winding and a secondary side winding, wherein said secondary side winding is electrically connected to the load ($R_{load}$).

3. A driver as claimed in claim 2, wherein the first coil of the first power transmission antenna coupled to an output terminal of the secondary side winding and adapted to receive power provided by the secondary side winding.

4. A driver as claimed in claim 3, further comprising:
    at least one additional coil in series with said first coil;
    at least one short circuiting switch, each of which in parallel with a respective one of said least one additional coil; and
    a control circuit coupled to said short circuiting switch, for controlling said switch to short circuit the respective additional coil, according to the power output by the secondary side winding and the power required to be transmitted to the second power receiving antenna.

5. A driver as claimed in claim 2, wherein said first coil is in parallel with the primary side winding and said second power receiving antenna comprises a second coil magnetically coupled with the first coil.

6. A driver as claimed in claim 2, wherein the first power transmission antenna comprises the primary side winding and the second power receiving antenna comprises a coil spaced with said primary side winding so as to receive a leakage flux of the primary side winding.

7. A driver as claimed in claim 2, wherein the first coil of the first power transmission antenna coupled to an output terminal of a flyback converter.

8. A driver as claimed in claim 7, wherein said flyback converter further comprises:
    a freewheel loop coupled across the primary side winding, said freewheel loop is adapted to freewheel the energy in the primary side winding;
    and the first coil of the first power transmission antenna is in the freewheel loop.

9. A driver as claimed in claim 8, wherein said freewheel loop comprises:
    a diode forwarded from the current out-flowing end of the primary side winding;
    a capacitor between the diode and the current in-flowing end of the primary side winding;
    and said first coil is in parallel with said capacitor.

10. A driver as claimed in claim 2, wherein the transformer further comprises a core on which said primary side winding and said secondary side winding are winded, wherein said core is magnetically conductive at the inner side and has an air gap at the outer side, and the outer side is adapted to couple an additional core on which said second coil is winded.

11. A driver as claimed in claim 1, wherein said driver is for driving an LED arrangement.

12. A luminaire comprising a driver as claimed in claim 1 and an LED arrangement driven by said driver.

13. A sensor system comprising:
    a luminaire as claimed in claim 12; and
    a sensor;
    said sensor comprises said second power receiving antenna.

14. A driver as claimed in claim 1, wherein the switched mode power supply is adapted to power/charge the power inductor during the active powering duration and
    the power inductor is adapted to discharge/release the charged power to the load ($R_{load}$) during the passive freewheeling duration.

15. A driver comprising:

a switched mode power supply adapted to be electrically coupled to a load (Rload) and provide power supply to the load (Rload), wherein said switched mode power supply comprises an existing coil, wherein said existing coil is a power inductor of the switched mode power supply which power inductor has an active powering duration and a passive freewheeling duration so as to provide power supply to the load (Rload), wherein the driver circuit includes, a first power transmission antenna formed as a first coil which is either the existing coil of the switched mode power supply or coupled to the existing coil of the switched mode power supply, said first power transmission antenna is adapted for being magnetically coupled to a second power receiving antenna external to said driver and different from the load (Rload), thereby forming a wireless power transmitter, wherein the switched mode power supply comprises a flyback converter including a transformer which has a primary side winding and a secondary side winding, wherein said secondary side winding is electrically connected to the load ($R_{load}$), wherein the first coil of the first power transmission antenna coupled to an output terminal of a flyback converter, wherein said flyback converter includes a freewheel loop coupled across the primary side winding, said freewheel loop is adapted to freewheel the energy in the primary side winding, a resistor in parallel with said capacitor and said first coil and a switch adapted to selectively switch either of the first coil or the resistor into the freewheel loop, and the first coil of the first power transmission antenna is in the freewheel loop.

* * * * *